Figure 1:
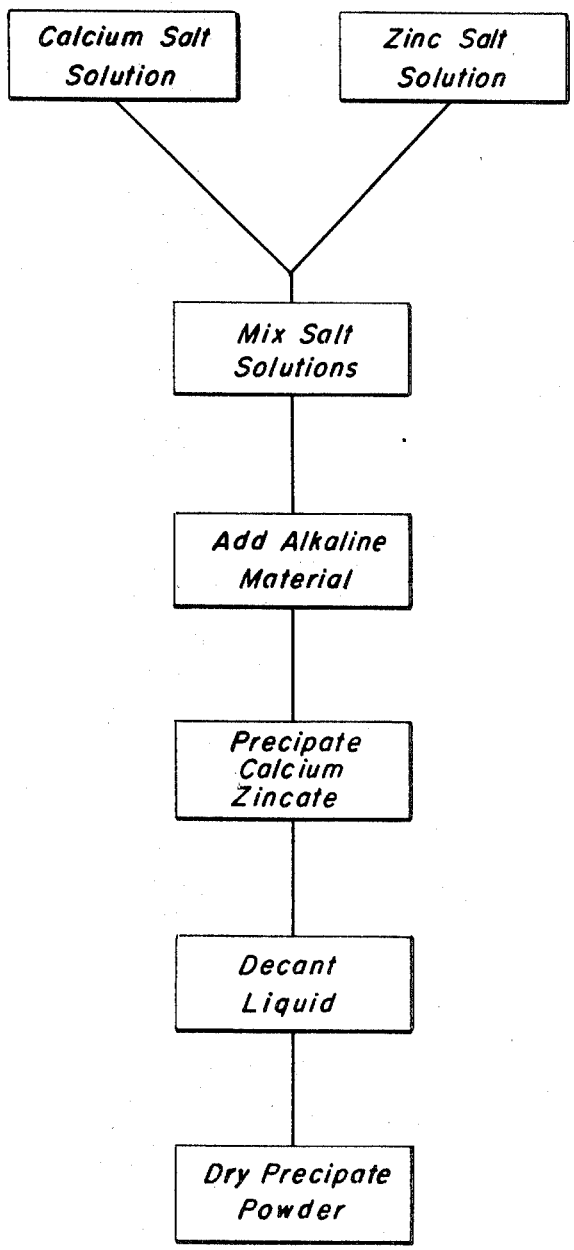

United States Patent

[11] 3,607,409

| [72] | Inventors | Robert P. Hamlen<br>Scotia;<br>John F. Wilfore, Troy, both of N.Y. |
|---|---|---|
| [21] | Appl. No. | 649,649 |
| [22] | Filed | June 28, 1967 |
| [45] | Patented | Sept. 21, 1971 |
| [73] | Assignee | General Electric Company |

[54] METHOD OF FORMING CALCIUM ZINCATE POWDER AND ELECTRODE
12 Claims, 2 Drawing Figs.

[52] U.S. Cl. ..................................................... 136/30,
23/55, 136/31, 136/125, 136/126
[51] Int. Cl. ......................................................H01m 43/02,
C01f 11/00, C01g 9/00
[50] Field of Search ............................................. 136/30, 31,
125, 126, 120, 154, 156; 23/55

[56] References Cited
UNITED STATES PATENTS

| 1,854,664 | 4/1932 | Ogden | 23/55 X |
|---|---|---|---|
| 1,943,334 | 1/1934 | Mitchell | 23/55 X |
| 3,136,647 | 6/1964 | Waitkins et al. | 23/55 X |
| 2,865,974 | 12/1958 | Scheuerle et al. | 136/107 |
| 3,226,260 | 12/1965 | Drengler | 136/30 |

FOREIGN PATENTS

| 497,968 | 11/1953 | Canada | 23/55 |
|---|---|---|---|
| 1,196,627 | 6/1963 | Germany | 23/55 |

OTHER REFERENCES

Lange; N. A. Handbook of Chemistry 1956 9th Edition p. 232, 233, 328 & 329.

Jacobson; C. A., Encyclopedia of Chemical Reactions, Vol. II, p. 133, 7/2/48, QD73J3, Reinhold Pub. Co., N.Y. N.Y.

*Primary Examiner*—Allen B. Curtis
*Attorneys*—Richard R. Brainard, Paul A. Frank, Charles T. Watts, Paul R. Webb, II., Melvin Goldenberg, Frank L. Neuhauser and Oscar B. Waddell ABSTRACT: A method of forming calcium zincate powder and an electrode from such powder comprises mixing together solutions of a soluble zinc salt and a soluble calcium salt, adding alkaline material to the mixed solution, and precipitating the calcium zincate. The liquid is decanted and the precipitate dried to provide a powder of calcium zincate with impurities of calcium hydroxide and zinc oxide. The powder contacted with a liquid, applied to a support or compacted under pressure to a particular configuration, and the powder is then dried to provide an electrode structure. Soluble zinc and calcium salts which may be employed in the method of the present invention include zinc acetate, zinc nitrate, zinc bromide, zinc chlorate, zinc perchlorate and zinc chloride, calcium acetate, calcium nitrate, calcium bromide, calcium chlorate, calcium perchlorate, calcium chloride, etc.

Inventors:
Robert P. Hamlen;
John F. Wilfore,
by Paul R. Webb, II
Their Attorney.

METHOD OF FORMING CALCIUM ZINCATE POWDER AND ELECTRODE

This invention relates to methods of forming calcium zincate powder and calcium zincate electrodes and, more particularly, to such methods wherein soluble salts of zinc and calcium are employed to prepare the calcium zincate powder and the electrode structure.

Calcium zincate powder is useful in the preparation of calcium zincate electrodes. Such electrodes can be utilized in silver-calcium zincate cells, nickel-calcium zincate cells or in other rechargeable alkaline cells employing a calcium zincate electrode. The calcium zincate electrode replaces the zinc electrode in such a rechargeable cell.

Presently, a major problem in rechargeable silver-zinc cells, and in other rechargeable alkaline cells employing a zinc electrode, is the formation of zinc dendrites during the recharging process. These dendrites are grown from the soluble potassium zincate which is present when a zinc electrode is discharged in potassium hydroxide, which is the most commonly employed electrode in a silver-zinc cell.

In order to overcome the above problem of zinc dendrite formation, recent work has been accomplished on the preparation of rechargeable nickel-zinc cells employing a relatively insoluble zinc-bearing material of calcium zincate as the anode. The calcium zincate appears to substantially reduce the dendrite formation of the zinc electrode. Such preparations have been directed to mechanical mixing of a slurry of calcium hydroxide and zinc oxide or electrolysis of a slurry of calcium hydroxide in sodium hydroxide solution using zinc electrodes to produce calcium zincate powder for the preparation of electrodes therefrom. Such methods of preparation are set forth in Russian Pat. application 594,052, Mar. 7, 1958, by N. A. Zhulidov, entitled "An Alkaline Storage Cell" and in Vest. Elektroprom., 1963, 34, No. 2, Feb., 74–75, by N. A. Zhulidov and F. I. Efremov.

It would be desirable to provide an improved method of forming calcium zincate powder which can be formed into calcium zincate electrodes. It would be advantageous to provide an improved method of forming calcium zincate electrodes from the calcium zincate powder. The present invention is directed to improved methods of preparing calcium zincate powder and calcium zincate electrodes from such powder.

It is an object of our invention to provide a new and improved method for the preparation of calcium zincate powder.

It is another object of our invention to provide an improved method of forming a calcium zincate electrode.

It is a further object of our invention to provide an improved method of forming a calcium zincate powder wherein soluble salts of both zinc and calcium are employed.

In accordance with our invention, a method of forming calcium zincate powder comprises providing a solution of a soluble zinc salt, providing a solution of a soluble calcium salt, mixing the solutions, adding alkaline material to the mixed solution thereby precipitating calcium zincate material from the solution, decanting the liquid, preferably washing the material with water, and drying the material thereby providing a powder consisting of calcium zincate with impurities of calcium hydroxide and zinc oxide. Additionally, methods of forming calcium zincate electrodes comprise contacting the powder with a liquid, applying the wetted powder onto a support or compacting the wetted powder under pressure to a particular configuration, and drying the powder thereby providing an electrode structure.

Figure 2:
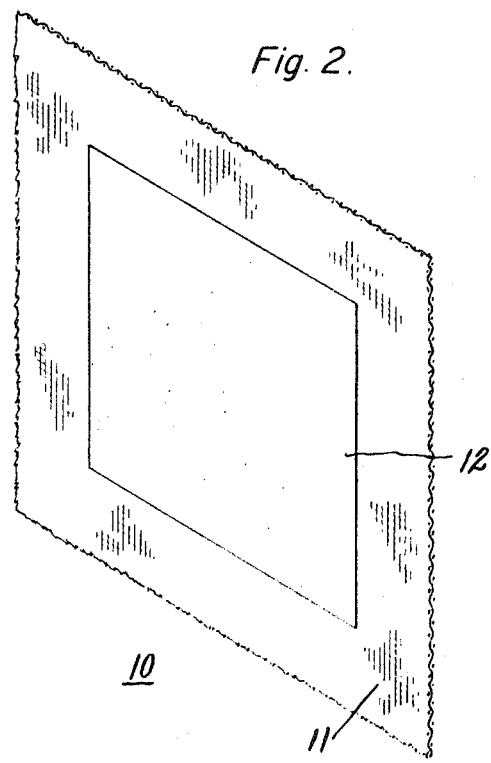

These and various other objects, features and advantages of the invention will be better understood from the following description taken in connection with the accompanying drawing in which:

FIG. 1 is a diagrammatic illustration of applicant's method of forming calcium zincate powder; and FIG. 2 is a perspective view of an electrode made in accordance with our invention.

In FIG. 1 of the drawing, there is shown a diagrammatic illustration of applicant's method of forming calcium zincate powder which comprises providing a solution of a soluble calcium salt, providing a solution of a soluble zinc salt, and mixing the solutions together. Alkaline material is then added to the mixed solution thereby precipitating calcium zincate material from the solution. The liquid is decanted and the precipitate is dried thereby providing a powder consisting of calcium zincate with impurities of calcium hydroxide and zinc oxide.

In FIG. 2 of the drawing, there is shown generally at 10 a preferred type of electrode made in accordance with our invention. Electrode 10 comprises a support in the form of a screen 11 of a suitable material such as silver, copper, zinc, brass, etc., which has an electrode portion 12. Electrode portion 12 consists of a layer of calcium zincate with impurities of calcium hydroxide and zinc oxide which is bonded to screen 11. The calcium zincate powder can be applied to screen 11 in a variety of manners. Our preferred method of forming an electrode structure is to contact the calcium zincate powder with a liquid. For example, we mix the powder with water to provide a wetted powder and apply it to screen 11 in any suitable manner such as by brushing in the area to be defined as the electrode portion. Subsequently, the electrode portion is dried to provide the resulting electrode structure.

We discovered unexpectedly that calcium zincate powder can be prepared by an improved method wherein a mixed solution of soluble salts of both calcium and zinc are used and an alkaline material is added to such mixed solution to precipitate the calcium zincate powder. We found that a wide variety of soluble salts of both zinc and calcium can be employed in our improved method. Such suitable soluble salts include calcium acetate, calcium nitrate, calcium bromide, calcium chlorate, calcium perchlorate, calcium chloride, zinc acetate, zinc nitrate, zinc bromide, zinc chlorate, zinc perchlorate, zinc chloride, etc. We prefer to employ soluble salts of zinc acetate, zinc nitrate, calcium acetate, calcium nitrate, etc. We found that we could mix a solution of a soluble zinc salt such as acetate and a solution of a soluble calcium salt such as calcium acetate together to form a mixed solution.

We found further that we could add alkaline material, which can be selected from a wide variety of materials, to the mixed solution thereby precipitating calcium zincate material from the solution. Suitable alkaline materials include potassium hydroxide, sodium hydroxide, lithium hydroxide, etc. Such materials may be added directly to the solution or may be prepared in solution form, which are easier to handle, and added to the mixed solution. We prefer to employ potassium hydroxide as the alkaline material. We found that the liquid can then be decanted. The precipitate is preferably washed with water and then dried to form a powder which consists of calcium zincate with impurities of calcium hydroxide and zinc oxide. The presence of calcium zincate, calcium hydroxide and zinc oxide are identified by their characteristic X-ray diffraction powder patterns.

We found further that we can form an electrode of calcium zincate by employing the above calcium zincate powder. The powder can be further ground or employed as obtained from the precipitate. It is contacted with a liquid such as water to provide a material which can be spread onto a support such as a metal screen of silver, copper, zinc, brass, etc. The plate is then dried thereby providing an electrode structure. Additionally, we found that such powder can be contacted with a liquid such as water, compacted under pressure to a particular configuration, and the powder dried thereby providing an electrode structure. Such a calcium zincate electrode is then assembled into a cell, for example, with a nickel plate, a calcium zincate plate, nonwoven Nylon separator and potassium hydroxide electrolyte. Such a cell operates quite satisfactorily and eliminates the zinc dendrite problem presented by the employment of a zinc electrode in such a structure.

In an illustrative formation of calcium zincate powder shown diagrammatically in FIG. 1 of the drawing, two solutions were prepared, one containing calcium acetate in water, and the other solution containing zinc acetate in water. These solutions were mixed together and 45 weight percent potassium hydroxide was added to the mixed solutions. Thereupon, the calcium zincate material precipitated from the solution. The resulting precipitate was allowed to settle for several hours and then the supernatent liquid was decanted. The precipitate was dried under an infrared lamp. An X-ray diffraction powder pattern showed that the material was calcium zincate with impurities of calcium hydroxide and zinc oxide. While the ratio of the calcium acetate to the zinc acetate can be varied widely, we prefer to employ a calcium to zinc mole ratio of 1.1 to 1. Further, while we prefer to employ 45 weight percent potassium hydroxide, since it is a commercially available material, other weight percentages of potassium hydroxide as well as other alkaline materials in solution may be used. Furthermore, alkaline material in powdered form can be added directly to the mixed solution.

In an illustrative formation of an electrode as shown in FIG. 2 of the drawing, the above powder which is formed in accordance with our method was further ground and dampened with water after which it was spread onto a copper expanded metal screen. The plate was then dried thereby providing an electrode structure. This plate was subsequently employed as the anode in the cell with a nickel plate, a nonwoven Nylon separator, and a potassium hydroxide electrolyte. The cell was cycled a number of times to demonstrate that the cell was operative.

A modified method of forming an electrode structure comprises adding a metallic powder such as zinc powder to calcium zincate powder. These powders are blended together after which the blended powder is contacted with a liquid. The wetted powder is compacted under pressure to a particular configuration, and the powder is dried thereby providing an electrode structure. The wetted powder can be applied to a support, and the powder dried to provide an electrode structure.

Examples of methods of forming calcium zincate powder and calcium zincate electrodes in accordance with our invention are set forth below:

EXAMPLE I

Calcium zincate powder was made in accordance with our method as shown in FIG. 1 of the drawing wherein separate solutions were prepared containing 3 grams of calcium acetate in 50 cc., of water and containing 3 grams of zinc acetate in 50 cc. of water. These solutions were mixed together. Ten cc. of 45 weight potassium hydroxide was added to the mixed solution thereby precipitating calcium zincate material from the solution. The resulting precipitate was allowed to settle for about 50 hours, after which the supernatant liquid was decanted. The precipitate was dried under an infrared lamp to provide calcium zincate powder. An X-ray diffraction powder pattern of this powder showed that the material was calcium zincate with impurities of calcium hydroxide and zinc oxide.

EXAMPLE II

Calcium zincate powder was made in accordance with our method as shown in FIG. 1 of the drawing wherein separate solutions were prepared containing 3 grams of calcium acetate in 50 cc. of water and containing 9 grams of zinc acetate in 50 cc. of water. These solutions were mixed together. Fifty cc. of calcium hydroxide which was 45 weight percent was added to the mixed solution thereby precipitating material from the solution. After 1½ hours, the supernatent liquid was decanted and the material washed in 1 liter of water. The material was then dried under an infrared lamp. An X-ray diffraction powder pattern showed that the material was calcium zincate with impurities of calcium hydroxide and zinc oxide.

EXAMPLE III

Calcium zincate powder was prepared in accordance with our method as shown in FIG. 1 of the drawing. A solution of calcium acetate was prepared by dissolving 310 grams of zinc acetate dihydrate in 1 liter of water while a second solution was prepared by dissolving 275 grams of calcium acetate monohydrate in 1 liter of water thereby providing a calcium to zinc mole ratio of 1.1 to 1. These solutions were mixed together. Alkaline material in the form of 25 weight percent potassium hydroxide was added to the mixed solution thereby precipitating calcium zincate material from the solution. The supernatent liquid was decanted. The precipitate was washed with water, buffered to a pH of 10 with ammonia and then was vacuum dried at 70° C. The resultant powder consisted of calcium zincate with impurities of calcium hydroxide and zinc oxide.

EXAMPLE IV

A calcium zincate electrode was formed as shown in FIG. 2 of the drawing by employing calcium zincate powder produced in accordance with EXAMPLE III. The powder was further ground, after which it was dampened with water and spread onto a copper expanded metal screen. The electrode material was then dried. The calcium zincate electrode was then assembled into a nickel-calcium zincate cell using a conventional nickel plate of the type used in a nickel-cadmium cell, nonwoven Nylon separator and a potassium hydroxide electrolyte. This plate contained 1 amp-hour of theoretical zinc capacity. The cell was cycled using approximately a 3 hour charge and a 1 hour discharge. Initially, the capacity was 0.5 amp-hour, and this gradually decreased to 0.3 amp-hour. After 172 cycles, the testing of this cell was terminated although the cell was still operative.

While other modifications of the invention and variations thereof which may be employed within the scope of the invention have not been described, the invention is intended to include such as may be embraced within the following claims.

What we claim as new and desire to secure by Letters Patent of the United States is:

1. A method of forming a powder which comprises providing a solution of a water soluble zinc salt, providing a solution of a water soluble calcium salt, mixing these solutions, adding an alkali metal hydroxide to the mixed solution thereby precipitating calcium zincate material from the solution, decanting the liquid, and drying the material thereby providing a powder consisting of calcium zincate with impurities of calcium hydroxide and zinc oxide.

2. A method as in claim 1, wherein the soluble salts are selected from the class consisting of acetates, nitrates, bromides, chlorides, chlorates, and perchlorates.

3. A method as in claim 1, wherein the alkali metal hydroxide is a solution of potassium hydroxide.

4. A method as in claim 1, wherein the precipitate material is washed with water prior to drying.

5. A method of forming an electrode structure wherein powder made in accordance with the method of claim 1 is contacted with a liquid, compacted under pressure to a particular configuration, and the powder is dried thereby providing an electrode structure.

6. A method as in claim 5, wherein the liquid is water.

7. A method as in claim 5, wherein a metallic powder is added to the calcium zincate powder before compaction.

8. A method as in claim 7, wherein the metallic powder is zinc powder.

9. A method of forming an electrode structure wherein the powder made in accordance with the method of claim 1 is contacted with a liquid, applied to a support, and the powder is dried thereby providing an electrode structure.

10. A method as in claim 9, wherein the liquid is water.

11. A method as in claim 9, wherein a metallic powder is added to the calcium zincate powder before wetting.

12. A method as in claim 11, wherein the metallic powder is zinc.